United States Patent
Caimi et al.

(10) Patent No.: US 11,094,427 B2
(45) Date of Patent: Aug. 17, 2021

(54) ELECTRICAL FIELD GRADING MATERIAL AND USE THEREOF IN ELECTRICAL CABLE ACCESSORIES

(71) Applicant: PRYSMIAN S.p.A., Milan (IT)

(72) Inventors: Luigi Caimi, Milan (IT); Stefano Pogliani, Milan (IT); Ivan Troia, Milan (IT)

(73) Assignee: PRYSMIAN S.p.A., Milan (IT)

(*) Notice: Subject to any disclaimer, the term of this patent is extended or adjusted under 35 U.S.C. 154(b) by 0 days.

(21) Appl. No.: 16/349,504

(22) PCT Filed: Nov. 15, 2016

(86) PCT No.: PCT/IB2016/056856
§ 371 (c)(1),
(2) Date: May 13, 2019

(87) PCT Pub. No.: WO2018/091941
PCT Pub. Date: May 24, 2018

(65) Prior Publication Data
US 2019/0295737 A1     Sep. 26, 2019

(51) Int. Cl.
*H01B 3/04*     (2006.01)
*H01B 3/00*     (2006.01)
(Continued)

(52) U.S. Cl.
CPC ............... *H01B 3/004* (2013.01); *C08K 3/04* (2013.01); *H01B 1/128* (2013.01); *H01B 1/22* (2013.01);
(Continued)

(58) Field of Classification Search
CPC . C08K 3/04; H01B 1/128; H01B 1/22; H01B 1/24; H01B 3/004; H01B 7/0291; H02G 15/064; H02G 15/184
See application file for complete search history.

(56) References Cited

U.S. PATENT DOCUMENTS 3,051,770 A * 8/1962 *Palmieri ............ H02G 15/103
                                                    174/22 R
4,075,421 A * 2/1978 McCullough ........ H01B 7/0291
                                                    174/120 R
(Continued)

FOREIGN PATENT DOCUMENTS

EP     1 235 232 A1     8/2002
EP     2 639 264 A1     9/2013
(Continued)

OTHER PUBLICATIONS

"Products—About Carbon Black", http://continentalcarbonindia.com/products/carbon-black.aspx (Year: 2009).*
(Continued)

*Primary Examiner* — Mark Kopec
*Assistant Examiner* — Jaison P Thomas
(74) *Attorney, Agent, or Firm* — Oblon, McClelland, Maier & Neustadt, L.L.P.

(57) ABSTRACT

Electrical field grading material which comprises a non-polar elastomeric polymer, a phyllosilicate filler and a carbon black filler, wherein any carbon black filler present in the electric field grading material has a dibutyl phthalate (DBP) absorption number from 30 to 80 ml/100 g. The above material may be used in electrical cable accessories, particularly electrical cable joints or terminations for medium or high voltage cable. The electrical field grading material according to the present invention has varioresistive properties, particularly a significant variation of electrical conductivity as a function of the applied voltage within a reduced voltage range, so as to guarantee a high value of conductivity above a critical value of the electrical field, and therefore to ensure an even distribution of the electrical field lines within the material.

13 Claims, 4 Drawing Sheets

(51) Int. Cl.
*C08K 3/04* (2006.01)
*H01B 1/12* (2006.01)
*H01B 1/22* (2006.01)
*H01B 1/24* (2006.01)
*H01B 7/02* (2006.01)
*H02G 15/064* (2006.01)
*H02G 15/184* (2006.01)

(52) U.S. Cl.
CPC ............. *H01B 1/24* (2013.01); *H01B 7/0291* (2013.01); *H02G 15/064* (2013.01); *H02G 15/184* (2013.01)

(56) References Cited

U.S. PATENT DOCUMENTS

| | | | |
|---|---|---|---|
| 4,303,574 A | 12/1981 | Vostovich | |
| 5,985,062 A * | 11/1999 | Vallauri | H02G 15/1826 156/51 |
| 6,086,792 A * | 7/2000 | Reid | H01B 1/24 174/102 SC |
| 8,383,012 B2 * | 2/2013 | Galletti | H01B 1/24 252/511 |
| 2013/0025909 A1 | 1/2013 | Perego et al. | |
| 2014/0065420 A1 * | 3/2014 | Sonerud | C08L 79/02 428/375 |
| 2017/0323700 A1 * | 11/2017 | Ryan | C08K 3/346 |

FOREIGN PATENT DOCUMENTS

EP 2532011 B1 * 12/2017 .......... C08L 23/0815
WO WO 2010/069341 A2 6/2010

OTHER PUBLICATIONS

International Search Report dated Jul. 11, 2017 in PCT/IB2016/056856, 3 pages.

B. R. Gupta: "Rubber Processing on a Two-Roll Mill" In: "Robber Processing on a Two-Roll Mill", Jan. 1, 1998 (Jan. 1, 1998). Allied Publishers Limited, New Delhi, New Delhi. XP055714267. ISBN: 978-61-70-23762-4 p. 150.

Office Action dated Jul. 20, 2020, In European Patent Application No. 16 809 527.1.

* cited by examiner

ELECTRICAL FIELD GRADING MATERIAL AND USE THEREOF IN ELECTRICAL CABLE ACCESSORIES

CROSS REFERENCE TO RELATED APPLICATION

This application is a national phase application of PCT/IB2016/056856, filed Nov. 15, 2016, the entire content and disclosure of which is incorporated into the present application.

FIELD OF THE INVENTION

The present invention relates to an electrical field grading material and to the use thereof in electrical cable accessories, particularly in cable joints or terminations.

BACKGROUND OF THE INVENTION

Electrical field grading materials are electrically stress-controlling compositions characterized by varioresistive properties, namely by an electrical conductivity which increases in a non-linear manner as a function of the applied voltage. These materials are also called varistors or voltage-dependent resistors. In the field of cable accessories, such as joints or terminations especially for medium to high voltage cables, electrical field grading materials are used to reduce the electrical stresses in electrically critical portions of the accessory, especially at the interface with the electrically insulating or semiconducting layers of the cable(s). At such interface the equipotential lines of the electrical field converge and thus the risk of electrical breakdown with perforation of the insulating material increases during use.

Various electrical field grading materials are known in the art, wherein a polymeric material is admixed with one or more fillers which are able to impart voltage-dependent resistivity.

U.S. Pat. No. 4,726,991 relates to a non-linear resistance material to provide electrical overstress protection, which comprises a mixture of discrete particles of conductive materials having sizes less than about several hundred microns, discrete particles of semiconductor materials also having sizes less than about several hundred microns, and insulator material coating the separate particles. The conductive particles can be formed of conductive materials including carbon black and graphite, whereas the semiconductor particles are preferably formed by silicon carbide. The insulator material can be, for instance, kaolin, kaolinite, aluminum trihydrate, feldspar, calcium carbonate, barium sulphate and calcium sulphate. The insulator material can comprise particles ranging in size from about 70 angstroms to about 300 angstroms.

US 2014/0065420 relates to a field grading material including a polymeric matrix and polyaniline as electrically conductive filler. The material may further include at least one additional electrically conducting organic filler, such as carbon black, in an amount from 3 to 20% by weight.

WO 2008/054308 relates to an electrically stress-controlling composition comprising a polymeric matrix and a particulate filler comprising doped zinc oxide varistor powder and possibly also an electrically conducting filler.

WO 2008/076058 relates to a field grading material comprising a polymeric matrix and a filler comprising zinc oxide and carbon black, wherein the zinc oxide is in the form of pure zinc oxide particles having at least one dimension smaller than or equal to 100 nm. The carbon black is, for example, Ketjenblack®, e.g. Ketjenblack® EC 300 or Ketjenblack® EC-600JD.

US 2006/0145119 relates to a field grading material including a polymeric matrix provided with a filler, which includes a field grading effective amount of particles having at least one dimension smaller than or equal to 100 nm. The filler may be $Al_2O_3$, $TiO_2$ or $BaTiO_3$. Alternatively, the filler may be a semiconducting material, preferably ZnO or SiC, which ensues a non-linear electrical resistance to the material, i.e. a resistance that decreases with an increasing electric field.

SUMMARY OF THE INVENTION

In the light of the above described state of the art, the Applicant has faced the problem of providing an electrical field grading material having varioresistive properties, particularly a significant variation of electrical conductivity as a function of the applied voltage within a reduced voltage range, so as to guarantee a high value of conductivity above a critical value of the electrical field, and therefore to ensure an even distribution of the electrical field lines within the material. Moreover, the above electrical performance should be accompanied by mechanical properties and processability which are fitting the application of the material by extrusion, particularly for the manufacturing of cable accessories.

The Applicant has now found that a polymer base added with a phyllosilicate filler and a carbon black filler which is not able to impart significant conducting properties when added to the polymer base, provides a composition with the sought field grading properties and with mechanical properties suitable for extrusion.

According to a first aspect, therefore, the present invention relates to an electrical field grading material which comprises a non-polar elastomeric polymer, a phyllosilicate filler and a carbon black filler, wherein any carbon black filler present in the electric field grading material has a dibutyl phthalate (DBP) absorption number from 30 to 80 ml/100 g.

According to a second aspect, the present invention relates to an electrical cable accessory, particularly an electrical cable joint or termination, for medium or high voltage cable, including an element made from the electrical field grading material as defined above.

For the purpose of the present description and of the appended claims, the words "a" or "an" are used to describe elements and components of the invention. This is done merely for convenience and to give a general sense of the invention. This description and claims should be read to include one or at least one, and the singular also includes the plural unless it is obvious that it is meant otherwise.

For the purpose of the present description and of the appended claims, except where otherwise indicated, all numbers expressing amounts, quantities, percentages, and so forth, are to be understood as being modified in all instances by the term "about". Moreover, all ranges include any combination of the maximum and minimum points disclosed and include any intermediate ranges therein, which may or may not be specifically enumerated herein.

For the purpose of the present description and of the appended claims, as "medium voltage" it is meant a cable suitable for carrying current at a voltage of from 1 to 40 kV, and as "high voltage" it is meant a cable suitable for carrying current at a voltage greater than 40 kV, preferably greater than 300 kV. At present, high voltage cable accessories have been described for voltages up to 600 kV.

For the purpose of the present description and of the appended claims, as "non-polar polymer" it is meant a polymer substantially devoid of dipoles, either in the polymer chain as such or generated when an electric field is applied. Typically, non-polar polymers have a dielectric constant not greater than 3.

For the purpose of the present description and of the appended claims, as "elastomeric polymer" it is meant a homopolymer or copolymer of substantially amorphous structure having elastic properties suitable for application in a power cable accessory.

For the sake of clearness, with the expression "any carbon black filler present in the electric field grading material has a dibutyl phthalate (DBP) absorption number from 30 to 80 ml/100 g" it is meant that the electrical field grading material does include a carbon black filler having a DBP absorption number within the above range (extremes included) and that it does not include any carbon black filler having a DBP absorption number outside the above range.

Preferably, the electrical field grading material of the invention comprises:
(i) from 30% to 80% by weight, more preferably, from 40% to 70% by weight, of the elastomeric polymer;
(ii) from 10% to 35% by weight, more preferably from 15% to 30% by weight, of the phyllosilicate filler; and
(iii) from 10% to 30% by weight, more preferably, from 15% to 25% by weight, of the carbon black filler;
the percentages being calculated on the basis of the total weight of the material.

In a preferred embodiment, the electrical field grading material of the invention comprises the phyllosilicate filler and the carbon black filler in a weight ratio of from 0.9 to 1.2.

DETAILED DESCRIPTION OF THE INVENTION

The phyllosilicate filler to be used in the compositions according to the present invention is generally a silicate substantially formed by parallel sheets of silicate tetrahedra, which are connected to each other by layers of cations. The phyllosilicate filler may be selected from the following mineral groups: clays, micas, serpentines, chlorites. Examples are: kaolin, illite, montmorillonite, vermiculite, talc. According to a preferred embodiment, the phyllosilicate filler is an aluminum phyllosilicate, more preferably kaolin.

Preferably, the phyllosilicate filler to be used in the compositions according to the present invention has an average particle size of at least 1 μm, preferably less than 10 μm.

The carbon black filler to be used in the compositions according to the present invention has a dibutyl phthalate (DBP) absorption number of from 30 to 80 ml/100 g, preferably from 60 to 80 ml/100 g. The DBP absorption number is measured according to ASTM D2414-06. The above ranges of DBP absorption number are typical of carbon black fillers having a medium-low structure, which are clearly distinguished from carbon black fillers having a high structure, such as the commercial products Ketjenblack®, which have a DBP absorption number greater than 300 ml/100 g and which are known to be suitable for providing conductive polymeric mixture. The DBP absorption number of the carbon black filler according to the invention is indicative of a structure insufficient for conductive or semi-conductive applications in electric cable field, as reported, for example, by U.S. Pat. No. 6,441,084.

Preferably, the carbon black filler to be used in the compositions according to the present invention has a iodine adsorption (a.k.a. iodine number) of from 20 to 50 mg/g, more preferably from 25 to 35 mg/g. The iodine absorption can be measured according to ASTM D 1510-06a.

In the material according to the invention, the elastomeric polymer is preferably crosslinked. According to the chemical nature of the elastomeric polymer, crosslinking may be carried out by different means, usually by radical reaction (e.g. by organic peroxides added to the material).

Preferably, the elastomeric polymer of the composition of the invention may be selected from:
(i) diene elastomeric polymers, generally having a glass transition temperature (Tg) below 20° C., preferably in the range of from 0° C. to −90° C.;
(ii) elastomeric copolymers of at least one mono-olefin with at least one olefinic comonomer or a derivative thereof;
(iii) silicone rubber.

As regards the diene elastomeric polymers (i), they may be of natural origin or may be obtained by solution polymerization, emulsion polymerization or gas-phase polymerization of at least one conjugated diolefin, optionally in admixture with at least one comonomer selected from monovinylarenes and/or polar comonomers in an amount of not more than 60% by weight.

The conjugated diolefin generally contains from 4 to 12, preferably from 4 to 8, carbon atoms. It may be selected preferably from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof. Isoprene is particularly preferred.

Monovinylarenes which may be optionally used as comonomers generally contain from 8 to 20, preferably from 8 to 12, carbon atoms, and may be preferably selected from: styrene, 1-vinylnaphthalene, α-methylstyrene, 3-methylstyrene, 4-propylstyrene, 4-p-tolylstyrene, or mixtures thereof. Styrene is particularly preferred.

Preferably, the diene elastomeric polymer (i) may be selected from: cis-1,4-polyisoprene (natural or synthetic, preferably natural rubber), 3,4-polyisoprene, polybutadiene, styrene/1,3-butadiene copolymers (SBR), styrene/isoprene/1,3-butadiene copolymers, or mixtures thereof.

As regards the elastomeric copolymers (ii), they may be obtained by copolymerization of at least one mono-olefin with at least one olefinic comonomer or a derivative thereof. The monoolefins may be selected from: ethylene and α-olefins generally containing from 3 to 12 carbon atoms, such as: propylene, 1-butene, 1-pentene, 1-hexene, 1-octene, or mixtures thereof. The following are preferred: copolymers of ethylene with an α-olefin, and optionally with a diene; isobutene homopolymers or copolymers thereof with small amounts of a diene. The optional diene generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Particularly preferred are: ethylene/propylene copolymers (EPR), ethylene/propylene/diene terpolymers (EPDM), polyisobutene, butyl rubbers; or mixtures thereof. Preferably, the EPR/EPDM rubbers have the following monomer composition: 55-80% by weight, preferably 65-75% by weight, of ethylene; 20-45% by weight, preferably 25-35% by weight, of propylene; 0-10% by weight, preferably 0-5% by weight, of a diene (preferably 5-ethylidene-2-norbornene).

The elastomeric polymer of the composition of the invention allows obtaining a cable accessory with suitable mechanical property, in particular in term of elasticity.

The electrical field grading material according to the present invention may also comprise other components. For instance, in order to crosslink the elastomeric polymer, at least one crosslinking agent may be added.

Preferably, crosslinking of the elastomeric polymer may be carried out by radical reaction, namely by thermal decomposition of at least one radical initiator, usually selected from organic peroxides, such as, for example, dicumyl peroxide, t-butyl cumyl peroxide, bis(t-butylperoxyisopropyl) benzene, bis(t-butylperoxy)-2,5 dimethyl hexane, bis(t-butylperoxy)-2,5-dimethyl hexyne 2,4-dimethyl-2,5-di(t-butylperoxy) hexane, di-t-butyl peroxide.

Besides the at least one radical initiator, at least one cross-linking coagent may be added, such as: triallyl-cyanurate, triallyl-isocyanurate, acrylates or diacrylates, polybutadiene having a high content of terminal vinyl groups, and mixtures thereof.

Other components that may be included in the electrical field grading material according to the present invention are: antioxidants, anti-ageing agents, plasticizers, lubricants, flame-retardants, thermal stabilizers.

The electrical field grading material according to the present invention may be prepared by mixing the elastomeric polymer, the phyllosilicate filler and the carbon black filler, and other possible additives, according to techniques well known in the art, for example by using an internal mixer of the type containing tangential rotors (Banbury) or interlocking rotors, or in continuous mixers of the Ko-Kneader (Buss) type or of the co-rotating or counter-rotating twin-screw type. At the end of the mixing, the composition may be reduced in a subdivided form, for instance granules or pellets, which is suitable to be fed into an extruder for the production of energy cable accessories according to well-known techniques.

As stated above, according a second aspect, the present invention relates to an electrical cable accessory, particularly an electrical cable joint or termination, which includes an element made from an electrical field grading material according to the present invention.

According to a particularly preferred embodiment, the electrical cable joint, particularly suitable for high voltage direct current cables, comprises:
- a central semiconducting electrode;
- two semiconducting deflectors;
- a field grading layer longitudinally extending between each one of the deflectors and the central electrode and in electric contact therewith;
- a joint insulating layer surrounding the central electrode, the two deflectors and the field grading layer; and
- a joint outer semiconductive layer surrounding and in direct contact with the insulating layer;

wherein the field grading layer is made from an electrical field grading material containing a phyllosilicate filler and, preferably, a carbon black filler having a dibutyl phthalate (DBP) absorption number from 30 to 80 ml/100 g.

BRIEF DESCRIPTION OF THE DRAWING

Further characteristics will be apparent from the detailed description given hereinafter with reference to the accompanying drawings, in which.

DETAILED DESCRIPTION OF THE PREFERRED EMBODIMENTS

Figure 1:
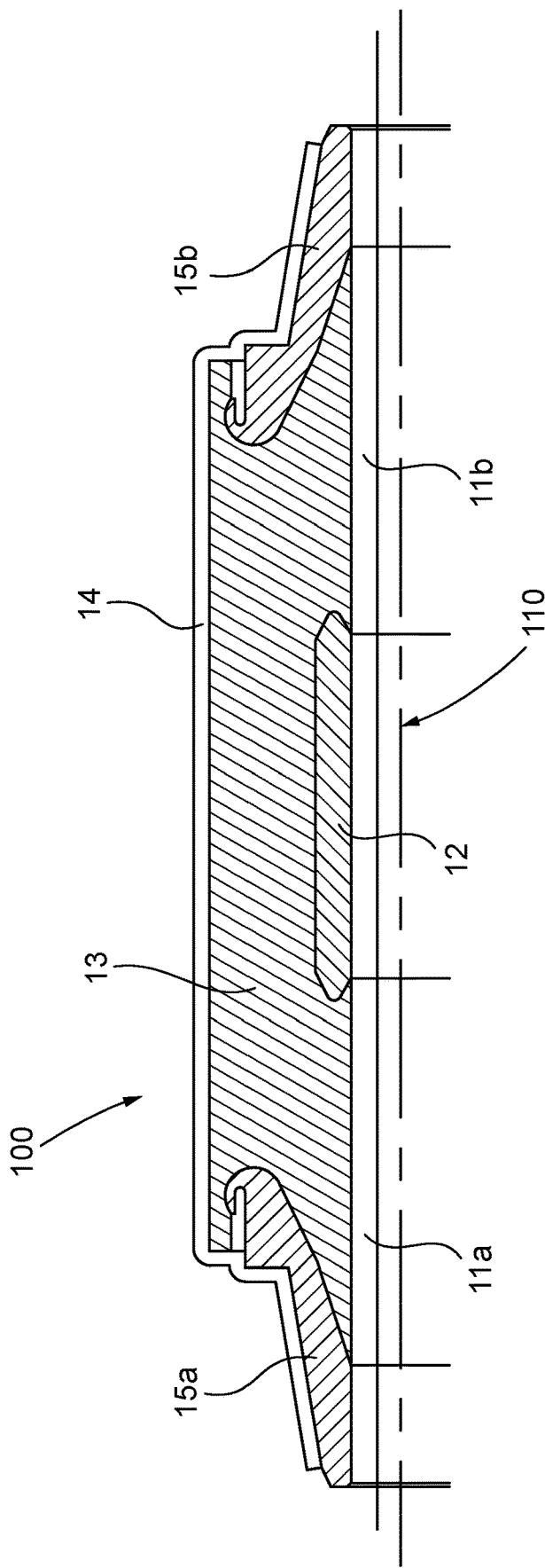
FIG. 1 is a partial longitudinal cross-section of a first joint, particularly suitable for HV cables, including an element made from an electrical field grading material according to the present invention.

In FIG. 1, a longitudinal section of an embodiment of a joint (100) mounted on a pair of joined electrical cables (110) according to the present invention is schematically represented.

Each cable of the joined cable pair (110) comprises a conductor (not shown in the figure) and an insulating layer (11a, 11b) made, for example, from crosslinked polyethylene (XLPE).

The joint (100) comprises: an insulating element (13), made of, e.g., cross-linked EPDM, encircling and being in contact with the cable insulating layer (11a, 11b) of the electrical cable (110). A semiconductive electrode (12) which is embedded in said electrically insulating element (13) encircles the cable (200) where the cable insulating layers (11a, 11b) are removed to bare the cable conductors then joined, and can encircle a limited portion of the insulating layers (11a, 11b) in the vicinity of the removal zone.

The joint (100) further comprises an outer semiconducting layer (14) encircling the electrically insulating element (13) and two stress-relief cones (15a, 15b), each provided at a side of the electrically insulating element (13). The two stress-relief cones (15a, 15b) are made from an electrical field grading material according to the present invention.

Figure 2:
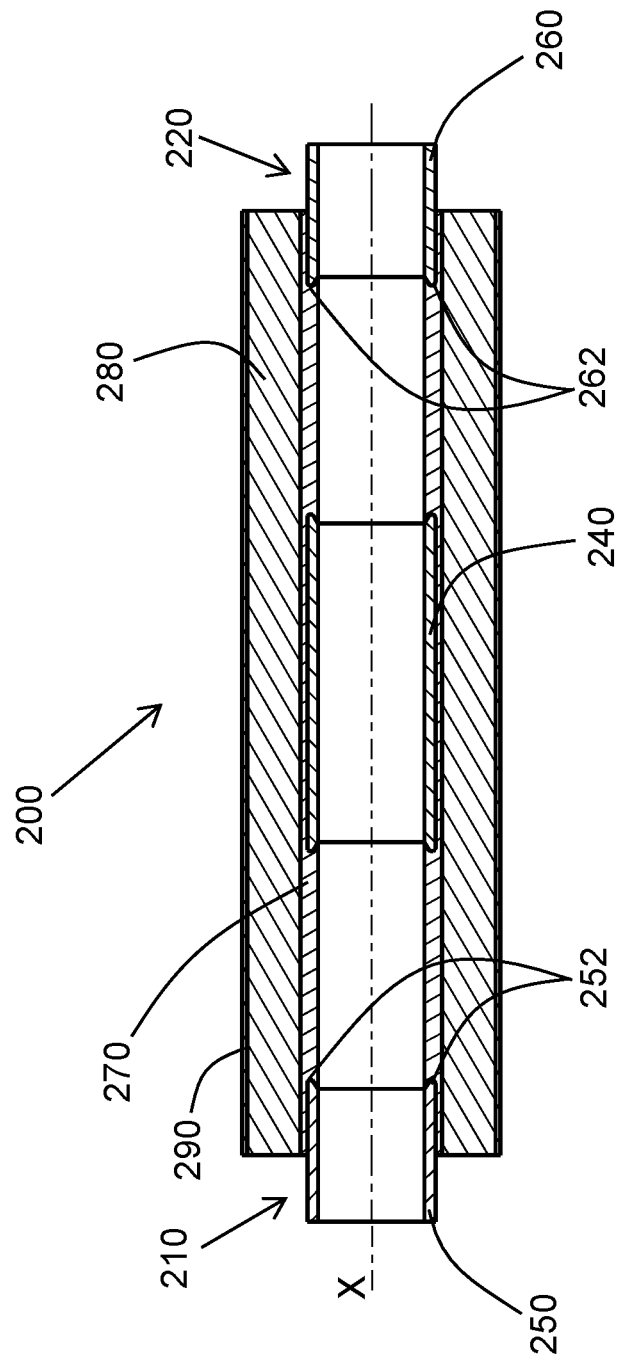
FIG. 2 is a partial longitudinal cross-section of a second joint, particularly suitable for HV cables, including an element made from an electrical field grading material according to the present invention.

In FIG. 2, a longitudinal section of another embodiment of a joint (200) according to the present invention is schematically represented. Differently from FIG. 1, the joint (200) is shown as such, before being mounted on a pair of joined electrical cables. The joint (200) extends along a longitudinal direction X between two opposite end portions (210, 220) and is suitable to be fit over the conducting core connection in the assembled configuration.

The joint (200) comprises a central electrode (240), made of semiconductive material, and two deflectors (250, 260), made of semiconductive material. The central electrode (240) is positioned in an intermediate position with respect to the end portion (210, 220) of the joint (200) and is arranged to surround the metal connector connecting the conducting cores of the two cables to be joined (not shown in the figure). The two deflectors (250, 260) are positioned at the end portions (210, 220) of the joint (200).

The joint (200) also comprises a field grading layer (270) which, in the embodiment of FIG. 2, longitudinally extends to partially cover and partially embed the two deflectors (250, 260) and to totally cover and partially embed the central electrode (240). The field grading layer (270) is made from an electrical field grading material according to the present invention.

As shown in FIG. 2, the field grading layer (270) overlaps the radially external surface and the longitudinal ends of the central electrode (240), and partially overlaps the radially external surface of the two deflectors (250, 260) and embeds their longitudinal end (252, 262) facing the central electrode (240). The field grading layer (270), transversally extends so as to be interposed between each one of the deflectors (250, 260) and the central electrode (240).

The joint (200) further comprises a joint insulating layer (280) that overlaps the field grading layer (270) so as to be positioned radially external thereto, and a joint outer semi-conductive layer (290) overlapping the insulating layer (280) so as to be positioned radially external to such an insulating layer (280). In the embodiment of FIG. 2, the field grading layer (270) longitudinally extends so as to be interposed between the insulating layer (280) and the electrode (240) and the two deflectors (250, 260).

Figure 3:
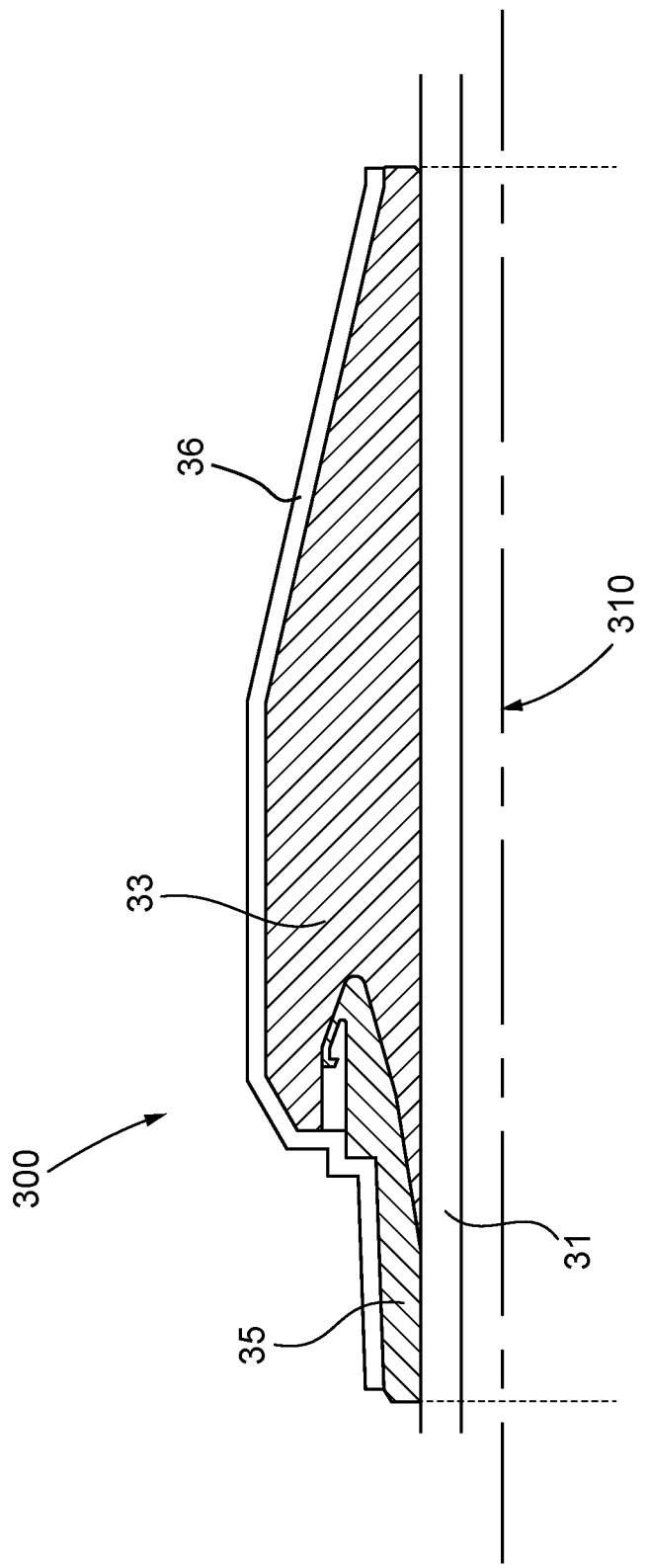
FIG. 3 is a partial longitudinal cross-section of a termination, particularly suitable for HV cables, including an element made from an electrical field grading material according to the present invention.

In FIG. 3, a longitudinal section of a preferred embodiment of a termination (300) mounted on an electrical cable (310) according to the present invention is schematically represented.

The electrical cable (310) comprises a conductor (not shown in the figure) and an insulating layer (31) made, for example, from crosslinked polyethylene (XLPE).

The termination (300) comprises: an insulating element (33), made for example from cross-linked EPDM, surrounding and in contact with the insulating layer (31) of the electrical cable (310) and a stress-relief cone (35) also surrounding and in contact with the insulating layer (31). The termination (300) further comprises an outer semiconducting layer (36) covering the insulating element (33) and the stress-relief cone (35). The stress-relief cone (35) is made from an electrical field grading material according to the present invention.

FIGS. 1, 2 and 3 show three embodiments of the present invention. Suitable modifications can be made to these embodiments according to specific technical needs and application requirements without departing from the scope of the invention.

The following examples are provided to further illustrate the invention.

EXAMPLES

The compositions as reported in Table 1 were prepared by using an internal Banbury mixer where all of the ingredients were added at the beginning, with the exception of the peroxide, which was added after discharging the composition in an open mill mixer. At the end of the mixing process, curing was effected by an electric press (15 min at 180° C. and 200 bar) to provide sample plates of 1.0 mm thickness. In the compositions reported in Table 1 the amounts of the various components are expressed as % by weight with respect to the total weight of the composition.

TABLE 1

| | EXAMPLE | | | | | |
|---|---|---|---|---|---|---|
| | 1 | 2(*) | 3(*) | 4(*) | 5(*) | 6(*) |
| EPDM rubber | 51.2 | 24.2 | 65.1 | 51.2 | 51.2 | 51.2 |
| HNBR | — | 24.2 | — | — | — | — |
| Kaolin | 21.9 | — | — | — | — | 21.9 |
| Carbon black (DBP = 65) | 19.4 | 9.7 | 10.4 | 19.4 | 19.4 | 17.6 |
| Carbon black (DBP = 118) | — | — | — | — | — | 1.8 |
| Polyisobutylene | 2.2 | — | 3.1 | 2.2 | 2.2 | 2.2 |
| Al-doped silicon carbide | — | — | 20.8 | — | — | — |
| Barium titanate | — | — | — | — | 10.9 | — |
| Titanium oxide | — | 36.2 | — | 21.9 | 10.9 | — |
| bis(t-butylperoxy-isopropyl) benzene | 1.0 | 1.5 | 1.0 | 1.0 | 1.0 | 1.0 |
| Additives | 5.3 | 5.8 | 0.5 | 5.3 | 5.3 | 5.3 |

(*)comparative
HNBR = hydrogenated nitrile butadiene rubber.

The additives reported in Table 1 are a mixture of conventional products selected from: plasticizers, antioxidant agents, thermal stabilizers, crosslinking coagents.

The compositions of Table 1 were tested for dielectric strength (DC), according to IEC 60243-2 (2001). The results are reported in Table 2.

TABLE 2

| | EXAMPLE | | | | | |
|---|---|---|---|---|---|---|
| | 1 | 2(*) | 3(*) | 4(*) | 5(*) | 6(*) |
| Dielectric strength (DC) (kV/mm) | 15.0 | 30.0 | 15.0 | 5.0 | 4.0 | <1 |

(*)comparative

The sample of comparative Example 6 had a very low dielectric strength for the application in an accessory for power cable. Samples of comparative Examples 4 and 5 had a poor dielectric strength.

Figure 4:
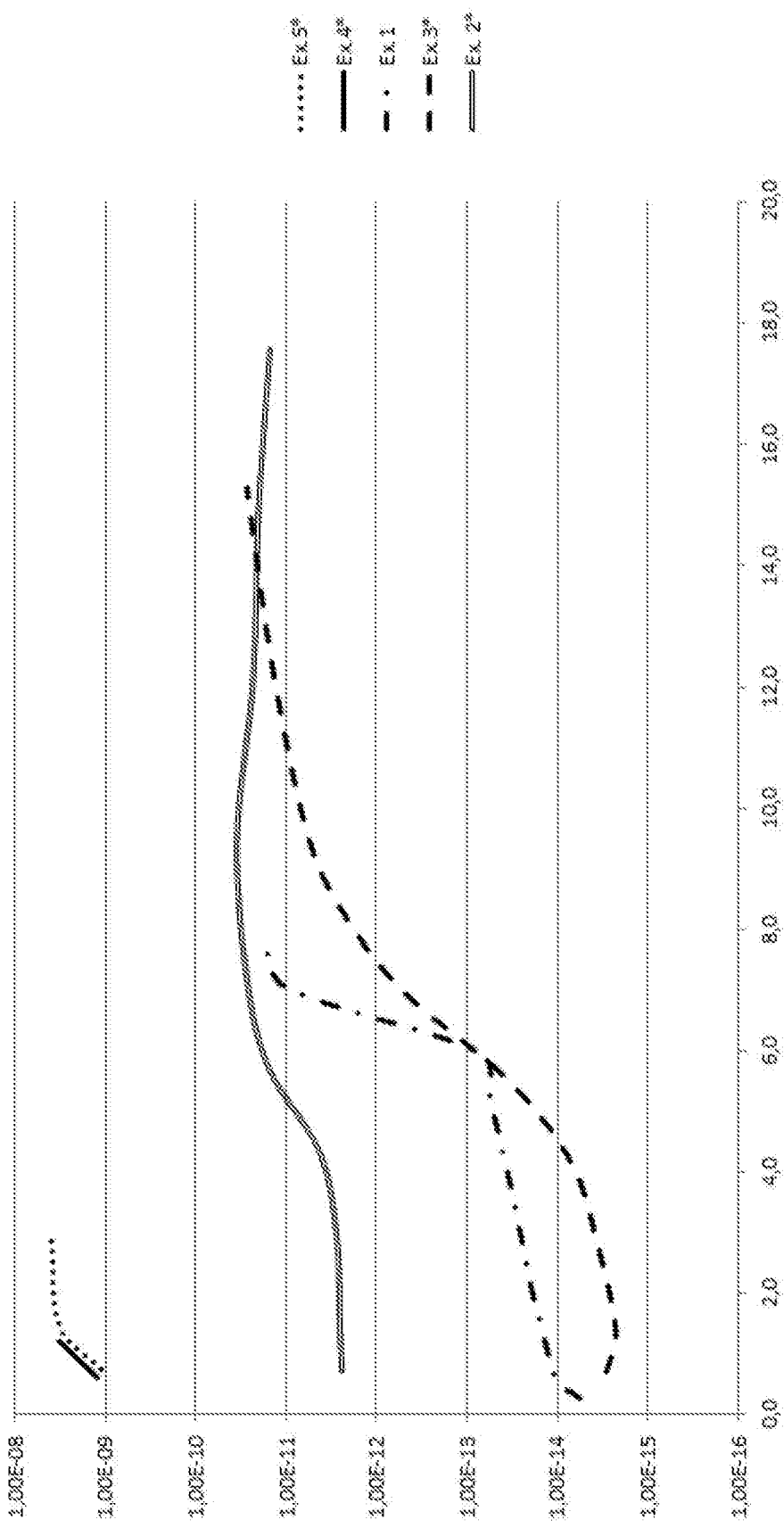
FIG. 4 is a graph reporting conductivity curves of samples of compositions according to the present invention and comparative ones.

Samples of Examples 1-5 were tested to evaluate their conductivity, according to IEC 60093 (1980). The results are reported in FIG. 4, where the curves are plotted with the applied voltage (kV/mm) in abscissae versus conductivity (S·m) in ordinates.

The compositions of comparative Examples 2 and 5, containing respectively titanium oxide and barium titanate/titanium oxide, are not vario-resistive as their conductivity increases very negligibly at voltage increase, therefore they cannot be used as field grading materials in cable accessories. In the case of the composition of Example 2, the polar polymeric component (HNBR) is believed to have played a negative role in the vario-resistive behaviour.

The composition of comparative Example 4 is too much conductive for insulating applications (like the compositions of comparative Examples 5) and its conductivity kept on increasing at voltage increase.

Samples of the composition of Example 1, according to the invention, and of comparative Example 3 (containing doped silicon carbide) showed satisfactory vario-resistive properties making them suitable as field grading materials.

Samples of the composition of Example 1 and of comparative Example 3 were tested to evaluate their mechanical properties, in particular elastic recovery after ageing, according to the following procedure.

Samples were kept under tensile stress at 200% elongation for 7 days in an oven at 70° C. Then, the elastic recovery of each sample was measured after 5 minutes from the sample release. The samples of Example 1 recovered about 60% of their initial length, thus the composition was suitable for electric cable accessories. The samples of comparative Example 3 were not able to complete the test because of rupture of the same. Such poor elastic properties made the composition of comparative Example 3 unsuitable for electric cable accessories.

The Applicant also observed that the composition of comparative Example 3 caused manufacturing problem. In particular, during the preparation of the samples, abrasion in the mixing apparatus occurred, probably due to the presence of silicon carbide. Such a drawback is to be carefully evaluated while considering a large scale production.

The present description shows only some embodiments of the present invention. Suitable modifications can be made to these embodiments according to specific technical needs and application requirements without departing from the scope of the invention.

The invention claimed is:

1. Electrical field grading material which comprises a non-polar elastomeric polymer, a phyllosilicate filler and a carbon black filler, wherein any carbon black filler present in the electric field grading material has a dibutyl phthalate (DBP) absorption number from 30 to 80 ml/100 g, and wherein the phyllosilicate filler and the carbon black filler are in a weight ratio of from 0.9 to 12.

2. Electrical field grading material according to claim 1, comprising:
   (i) from 30% to 80% by weight of the non-polar elastomeric polymer:
   (ii) from 10% to 35% by weight of the phyllosilicate filler, and
   (iii) from 10% to 30% by weight of the carbon black filler, the percentages being calculated on the basis of the total weight of the material.

3. Electrical field grading material according to claim 2, comprising from 40% to 70% by weight of the non-polar elastomeric polymer.

4. Electrical field grading material according to claim 2, comprising from 15% to 30% by weight of the phyllosilicate filler.

5. Electrical field grading material according to claim 2, comprising from 15% to 25% by weight of the carbon black filler.

6. Electrical field grading material according to claim 1, wherein the phyllosilicate tiller is selected from: kaolin, illite, montmorillonite, vermiculite, talc.

7. Electrical field grading material according to claim 6, wherein the phyllosilicate filler is kaolin.

8. Electrical field grading material according to claim 1, wherein the phyllosilicate filler has an average particle size of at least 1 μm.

9. Electrical field grading material according to claim 8, wherein the phyllosilicate filler has an average particle size of less than 10 μm.

10. Electrical field grading material according to claim 1, wherein the carbon black filler has a dibutyl phthalate (DBP) absorption number of from 60 to 80 ml/100 g.

11. Electrical field grading material according to claim 1 wherein the carbon black filler has a iodine adsorption of from 20 to 50 mg/g.

12. Electrical cable accessory which includes an element made from an electrical field grading material according to claim 1.

13. Electrical cable joint, comprising:
    a central semiconducting electrode;
    two semiconducting deflectors;
    a field grading layer longitudinally extending between each one of the deflectors and the central electrode and in electric contact therewith:
    a joint insulating layer surrounding the central electrode, the two deflectors and the field grading layer; and
    a joint outer semiconductive layer surrounding and in direct contact with the insulating layer;
    wherein the field grading layer is made from an electrical field grading material according to claim 1.

* * * * *